United States Patent
Dolza, Sr.

[11] 3,918,419
[45] Nov. 11, 1975

[54] SEGREGATED LEAN-RICH FED SPARK IGNITION ENGINE

[76] Inventor: John Dolza, Sr., 810 State St., Fenton, Mich. 48430

[22] Filed: Aug. 20, 1973

[21] Appl. No.: 388,849

[52] U.S. Cl......... 123/75 B; 123/32 ST; 123/32 SP; 123/191 S
[51] Int. Cl.² ..................... F02B 19/10; F02B 75/02
[58] Field of Search ......... 123/191 S, 191 SP, 32 C, 123/32 D, 32 K, 32 ST, 32 SP, 32 SA, 75 B, 169 EL

[56] References Cited
UNITED STATES PATENTS

| | | | |
|---|---|---|---|
| 1,136,961 | 4/1915 | Inman et al.................. | 123/169 EL |
| 1,303,965 | 5/1919 | Robinson..................... | 123/169 EL |
| 1,418,632 | 6/1922 | Donavan...................... | 123/169 EL |
| 2,054,413 | 9/1936 | Fisher et al.................. | 123/32 SP X |
| 2,085,035 | 6/1937 | Meredith...................... | 123/191 S |
| 2,242,990 | 5/1941 | Brown.......................... | 123/32 ST |
| 2,453,377 | 11/1948 | Lozivit........................ | 123/75 B |
| 2,744,211 | 5/1956 | Berkman...................... | 123/191 S X |
| 2,799,257 | 7/1957 | Stumpfig et al............. | 123/32 SP X |
| 2,807,250 | 9/1957 | Mallory........................ | 123/75 B |
| 2,866,447 | 12/1958 | Kaehni......................... | 123/191 S |
| 2,869,526 | 1/1959 | Dolza........................... | 123/139 AW |
| 3,066,662 | 12/1962 | May et al..................... | 123/32 ST X |
| 3,255,739 | 6/1966 | Von Seggern et al......... | 123/32 ST |
| 3,270,721 | 9/1966 | Hideg et al................... | 123/32 ST |
| 3,283,751 | 11/1966 | Goossak et al................ | 123/32 ST |
| 3,382,850 | 5/1968 | Baudry et al................. | 123/75 B X |
| 3,678,905 | 7/1972 | Diehl............................ | 123/75 B X |

FOREIGN PATENTS OR APPLICATIONS 967,498  11/1950  France.......................... 123/191 SP Primary Examiner—Charles J. Myhre
Assistant Examiner—Tony Argenbright
Attorney, Agent, or Firm—Reising, Ethington, Barnard, Perry & Brooks

[57] ABSTRACT

An ignitable fuel mixture and a lean mixture (or air) are both admitted by a common inlet valve from separate passage sectors of a partitioned intake passage to the main combustion chamber which extends across one end of the cylinder opposite the piston, with the ignitable mixture being directed into a segregation chamber where ignition is effected by a spark plug. The piston has a projection to redirect the richer fuel and air mixtures toward the entrance to the segregation chamber during the compression stroke.

12 Claims, 12 Drawing Figures

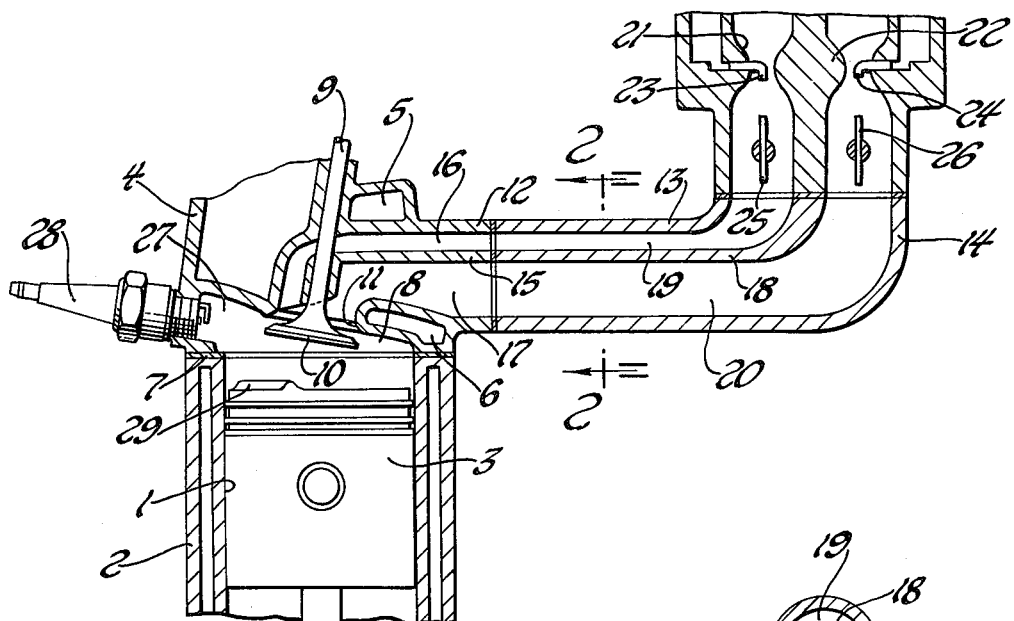

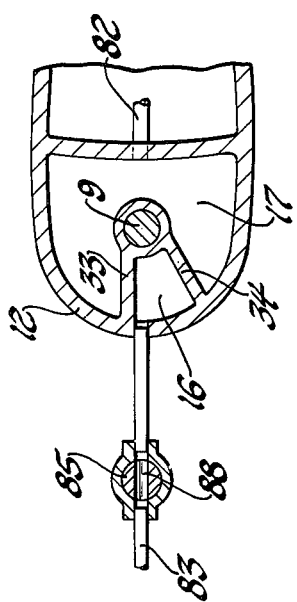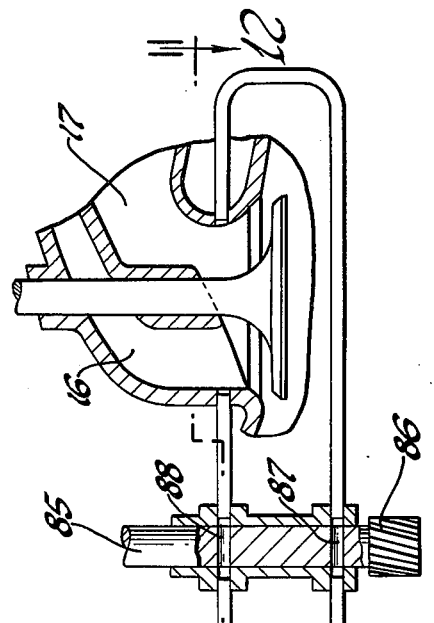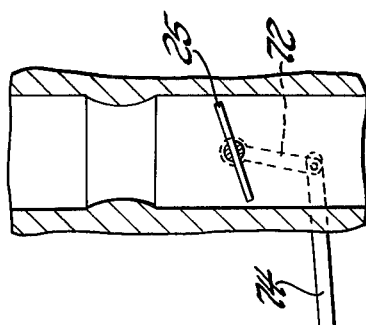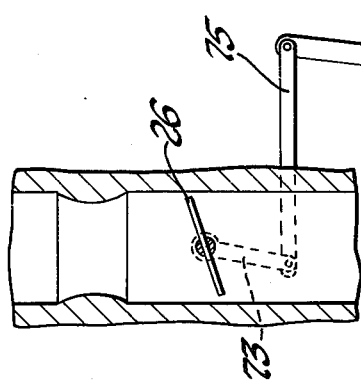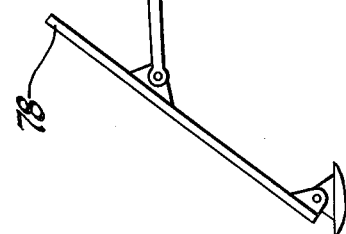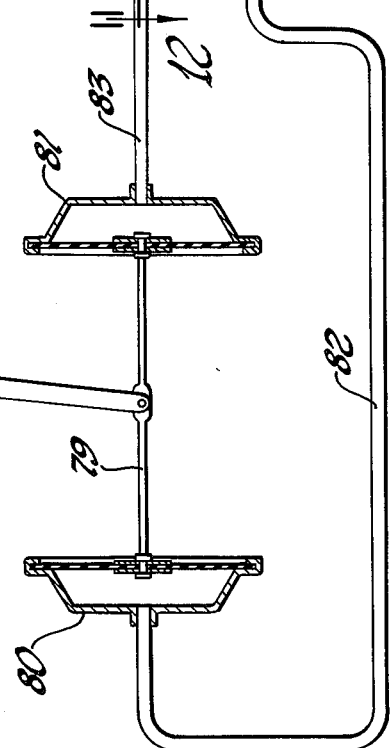

3,918,419

SEGREGATED LEAN-RICH FED SPARK IGNITION ENGINE

SUMMARY AND BACKGROUND OF THE INVENTION

This invention relates to a spark ignition internal combustion engine of the four-stroke cycle type.

Prior art shows that the amount of carbon monoxide, hydrocarbons and nitrous oxides in the exhaust of an internal combustion spark ignition engine is greatly reduced if the air-fuel mixture is delivered to the combustion chamber in two separate, i.e. segregated, flows having respectively different fuel air ratios. A rich mixture is delivered in the vicinity of the spark plug and retained there until ignited. A lean mixture (or air) is simultaneously delivered to fill the remainder of the combustion chamber and is subsequently ignited by the developing flame front resulting from ignition of the rich mixture. Such engines are much more economical to produce and to operate than conventional spark ignition engines equipped with catalytic and other afterburner devices to remove carbon monoxide, hydrocarbons and nitrous oxides from the exhaust. Although engines of this broad category have been proposed heretofore, their designs have failed to win acceptance for high volume commercial production, either because their performance was unsatisfactory, or because the extensive tooling required made their cost prohibitive. Included in such previously proposed designs are both carbureted and fuel injection engines of both the open combustion chamber type and prechamber type. Representative of prior U.S. patents containing disclosures of such prechamber type engines are Mallory U.S. Pat. Nos. 2,098,875, Brown 2,242,990, Heintz 2,884,913 and 2,893,268, Goossak 3,230,939, and Goossak et al. 3,092,088 and 3,283,751. The U.S. Pat. No. 3,318,292 to Hideg provides for injection of the fuel into one sector of a partitioned manifold, but relies upon control of swirl within a common combustion chamber to maintain segregation of the ignitable mixture, and the U.S. Pat. Nos. of Myrick 2,466,181 and Heintz 3,113,561 employ partitioned intake passages and prechambers in two cycle engines. The Diehl U.S. Pat. No. 3,678,905 also discloses a partitioned manifold, but only with a single or a common combustion chamber. Of the aforementioned which relate to four cycle engines and in which ignition is effected in a chamber separate from the main combustion chamber, all but Goossak et al. U.S. Pat. No. 3,283,751 employ separate intake valves for the rich and lean mixtures. Although the latter Goossak et al. patent contemplates using a single inlet valve, relatively little of the rich mixture can be segregated in the chamber containing the spark plug because of its inadequate depth and lack of means for directing the rich mixture thereinto, etc., so that relatively little actual segregation of the fuel charge at ignition is accomplished.

The added cost, however, of adding a separate intake valve or fuel injector is obviated in accordance with my invention which employs a unique combination of segregation chamber shape, dimensioning and geometric relation with the engine's single intake valve, plus a piston head configuration which cooperates therewith in directing or confining a rich fuel and air mixture within the segregation chamber where it is ignited by the spark plug. This rich mixture enters the cylinder through a relatively narrow section of the valve opening from the rich mixture sector of the intake passage, with the lean mixture (or air) entering the cylinder through the remaining relatively large area of the valve opening, in directions away from the entrance to the segregation chamber. The two mixtures may be introduced through separately partitioned portions of the intake passage by individual carburetors, whose controls may be interconnected, or a single carburetor may be used to supply the rich mixture sector of the passage and pure air be throttled in the other sector with a bleed-off passage thereinto from the rich mixture sector to enrich somewhat the non-carbureted air entering the cylinder.

A better understanding of my invention will be had from the following description, having reference to the drawings, wherein:

BRIEF DESCRIPTION OF THE DRAWINGS

FIG. 1 is a schematic view in vertical cross-section through one cylinder and its divided intake system of an internal combustion engine embodying the invention.

FIG. 2 is a generally vertical view taken in the direction of the arrows along the lines 2—2 of FIG. 1, showing the divided intake passage.

FIG. 3 is an enlarged fragmentary vertical section, similar to FIG. 1.

FIG. 11 is a schematic view of mechanism for correlating the degree of opening of the throttle valves in the respective passage sectors in accordance with the pressures therein at the intake valve seat during the suction stroke of the piston.

FIG. 12 is a fragmentary section taken substantially on the line 12—12 of FIG. 11.

DESCRIPTION OF PREFERRED EMBODIMENTS

Figure 4:
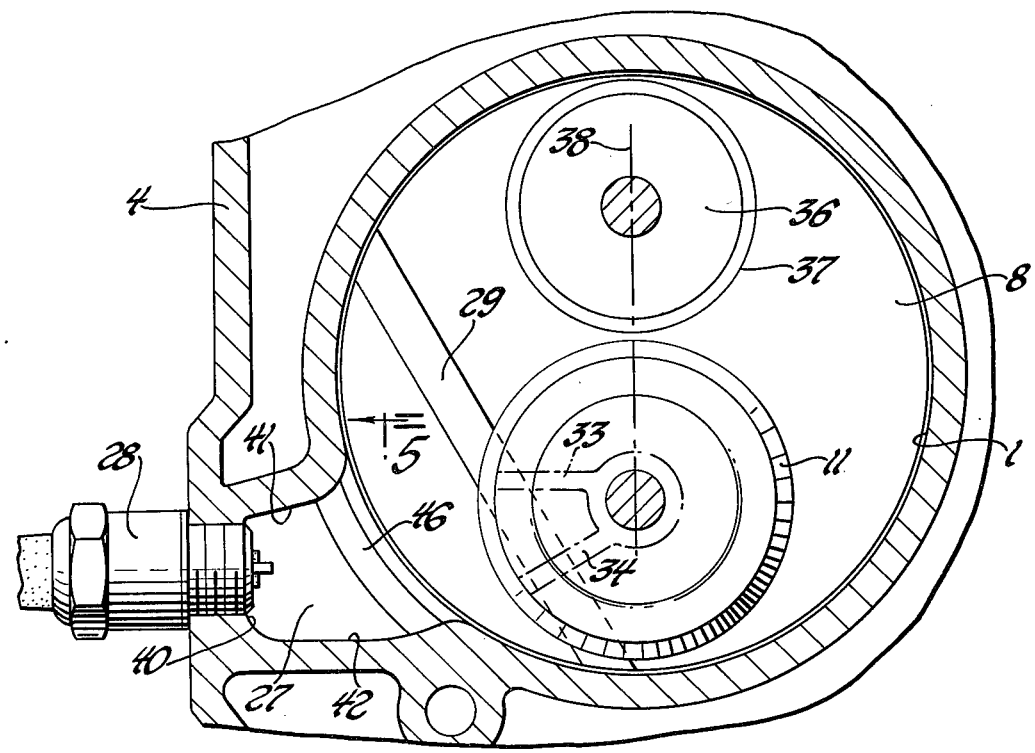
FIG. 4 is a sectional view taken in the direction of the arrows along the lines 4—4 of FIG. 3.

Referring now in detail to the drawings, and first to FIG. 1, a power cylinder 1 of an internal combustion engine is shown, surrounded by a water jacket 2 and fitted with a piston 3. A cylinder head 4, containing water coolant spaces 5 and 6, closes one end 7 of the cylinder opposite the piston and forms therewith a main combustion chamber 8. A single inlet valve 9 of the poppet type controls admission of fuel and air to the cylinder, the head 10 of this inlet valve opening into the main combustion chamber 8 from a valve seat 11 in the wall of the cylinder head opposite the postion. An inlet passage 12 in the cylinder head is connected to the main combustion chamber at the valve seat 11 and has its other end connected to the riser 13 of an inlet manifold 14. A partition 15 longitudinally divides the intake passage 12 into separate passage sectors 16 and 17, and a similar partition 18 correspondingly divides the manifold riser 13 into separate passage sectors 19 and 20, at whose other ends are shown carburetor venturi throats 21, 22 and fuel feed pipes 23, 24. Downstream of the venturi throats within the inlet passage sectors are butterfly type throttle valves 25, 26. Extending from the main combustion chamber 8, adjacent the inlet valve head 10 is a fuel mixture segregation chamber 27 containing a spark plug 28 at its end furthest from the main combustion chamber. Also illustrated is a ridge or deflector 29 which projects upwardly from and extends transversely of the head of the piston in a plane opposite the entrance to the segregation chamber 27. FIG. 2 shows the manifold inlet riser 13 as being generally circular in transverse section, with the partition 18 extending thereacross to separate the upper passage sector 19 from the lower passage sector 20.

The arrangement and geometric relation of the segregation chamber 27 to the main combustion chamber 8 is best shown in the larger scale views of FIG. 3 and FIG. 4. The inlet passage partition 15 in the cylinder head terminates at its valve seat end with spaced wall portions 33 and 34 which define a restricted entrance from the upper passage sector 16 in the cylinder head to the main combustion chamber for the relatively rich, spark ignitable, fuel mixture flowing therethrough from the upper passage sector 19 in the manifold riser 14 when the inlet valve 9 is open during the suction stroke of the piston 3. Such rich mixture is introduced at the upper end of the riser passage sector 19 by the mixing of fuel from the feed pipe 23 with the air passing through the venturi 21. The restricted entrance defined by the wall portions 33,34 represents between 5 and 20 percent of the total valve opening area bounded by the inlet valve seat 11, the remaining area of which accommodates entry into the main combustion chamber 8 and the interior of the cylinder 1 of other gaseous fluid flowing through the lower passage sector 17 in the cylinder head from its connecting lower passage sector 20 in the manifold riser. It is to be noted that such other gaseous fluid may either be simply air entering the riser lower passage sector 20 from the venturi 22, or a relatively lean mixture (below the stoichiometric ratio) of such air with fuel supplied thereto from the fuel feed pipe 24. The selection as to whether air alone, or a lean mixture containing some fuel, is to be introduced through the riser and cylinder inlet passage sectors 20, 17 would be determined upon the basis of the power requirements of the engine and the relative volumes of the segregation chamber 27, main combustion chamber 8 and the volume of the cylinder 1 which is swept by the piston 3 during its suction stroke, as well as by the degree to which the rich mixture delivered through the upper passage sectors 19,16 is enriched above the stoichiometric ratio. As best shown in FIG. 4, the deflecting ridge 29 on the piston is located generally opposite the restricted entrance formed by the wall portions 33, 34.

Figure 5:
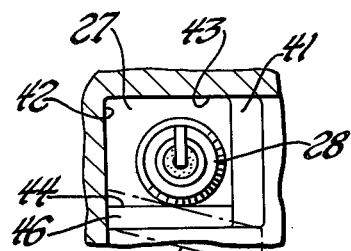
FIG. 5 is a part elevational, part sectional fragmentary view taken in the direction of the arrows 5—5 in FIG. 4.

As indicated in FIG. 4, the engine also includes an exhaust valve 36 whose seat 37 is also in the upper wall of the main combustion chamber 8 at a location adjacent the inlet valve seat 11. The segregation chamber 7, which is open at one end to the main combustion chamber 8, extends from the latter in a direction generally tangential to the cylinder 1 and generally perpendicular to a line 38 bisecting the inlet and exhaust valve seats. The spark plug 28 is located in the extended end 40 of the segregation chamber 27, opposite the main combustion chamber 8. As indicated in FIG. 5, the segregation chamber may be generally rectangular in transverse section, having side walls 41, 42, an upper wall 43 and a bottom wall 44. The two side walls are rounded at their junctures with the periphery of the chamber 8 as shown in FIG. 4. At the juncture of the upper wall 43 with the inlet valve seat 11 there is formed a laterally directed baffle 45 which defines the upper extremity of the open end of the segregation chamber. The lower extremity of the open end of this chamber is defined by the end 7 of the engine cylinder 1 which is connected to the bottom wall 44 of the segregation chamber by an inclined arcuate rim or step 46.

The depth of the segregation chamber, as represented by the distance between its extended end 40 and its open end at the periphery of the cylinder, is preferably one-fifth to one-half of the cylinder bore diameter, and the volume of the segregation chamber should be within 1 percent and 4 percent, and preferably within 2 percent and 3 percent, of the piston-swept volume of the cylinder. Referring again to FIG. 3 which shows the inlet valve in its full open position, it will be noted that the upper and lower extremities of the open end of the segregation chamber are approximately equidistant above and below the plane of the inlet valve head 10. The inlet valve seat and the seat engaging surface of the inlet valve head 10 are shown as being at an angle of approximately 45° to the axis of the inlet valve.

During engine operation, while the piston is on its suction stroke and the inlet valve is in its open position, the rich fuel mixture entering the main combustion chamber through the restricted entrance formed by the opposing wall portions 33, 34 will flow outwardly and somewhat downwardly between the inlet valve seat and the valve head until they strike or intersect the periphery of the main combustion chamber and the cylinder bore. The pattern of such rich mixture flow at the cylinder periphery is illustrated in broken outline in FIG. 5 as a parallelogram 48. This pattern is inclined downwardly toward the right, as viewed in FIG. 5, because the portion of the rich mixture having the greater distance to flow before reaching the cylinder head and cylinder periphery will also intersect the cylinder head and cylinder periphery at a lower level than will those portions of the rich mixture flow which have a shorter distance to travel before intersecting the cylinder periphery. As a result, only approximately one-half of the rich mixture flow pattern 48 extends above the lower extremity 44 of the open end or entrance to the segregation chamber, and the remaining half of the flow pattern lies below such lower extremity 44 and the rich mixture flow in this latter half is directed against the cylinder bore below the segregation chamber. The portion of the rich mixture flow represented by the upper half of the flow pattern 48 is thus directed into the segregation chamber, most of it being deflected upwardly thereinto by the inclined step 46. On striking the extended end 40 of the segregation chamber such rich mixture is again deflected thereby against its upper wall 43 and outwardly toward the open end of the segregation chamber. Such repeated changes of direction of the rich mixture within the segregation chamber serve to slow the velocity of the flow and to create a swirl action within the chamber in a clockwise direction as viewed in FIG. 3. The baffle 45 both assists in enhancing this clockwise swirl motion and in directing the fuel mixture escaping from the segregation chamber downwardly of the cylinder with minimum intermixture of such rich mixture with the air or lean mixture entering the cylinder from the lower passage sector 17. Then, as the piston moves upwardly on its compression stroke, the rich mixture which has been directed downwardly of the cylinder by the cylinder bore surfaces is redirected first radially by the cylinder head and thence again upwardly by the deflecting ridge 29 on the piston head, with the result that a counter-swirl in a counter-clockwise direction is created in the gaseous mixture contained in the cylinder between the deflecting ridge 29 and the adjacent wall surface of the cylinder. This latter mixture, being considerably richer than that within the remainder of the cylinder, is thus forced back into the segregation chamber against that portion of the originally rich mixture which entered the segregation chamber initially and remained therein during the suction stroke. As a consequence, this latter portion of the fully rich mixture is compressed against the extended end 40 of the segregation chamber by the leaner, but still relatively rich, mixture forced into the segregation chamber by the piston during the suction stroke. Such a segregation chamber has sufficient depth in relation to its volume that the fully rich mixture thus "packed" into its extended end will fully envelop both the insulated electrode 50 and the ground electrode 51 of the spark plug, thereby insuring the start of ignition and rapid propagation of the flame front through the enriched leaner mixture adjacent thereto to produce a torch-like flame which will migrate outwardly and fully across the main combustion chamber to effect complete combustion of the remaining lean portion of the fuel charge.

The spark plug 28 illustrated is of the conventional type having an annular shell 52 which is threaded into the cylinder head so as to extend longitudinally of the segregation chamber. Its ground electrode 51 projects into the chamber and transversely from the inner end of the shell to effect the proper spark gap spacing with the end of the insulated electrode 50. Surrounding the latter is the usual tapered insulator body 53 whose tapered external periphery is spaced radially inward of the shell 52 and thus forms an annular cavity 54 which constitutes a portion of the volume of the segregation chamber 27. As a result, when using this type spark plug the volume of the cavity 54 necessarily extends the required depth of the segregation chamber in relation to the volume thereof in order to insure that the richest portion of the fuel mixture envelops the spark plug electrodes for optimum ignition when the spark plug fires.

Figure 6:
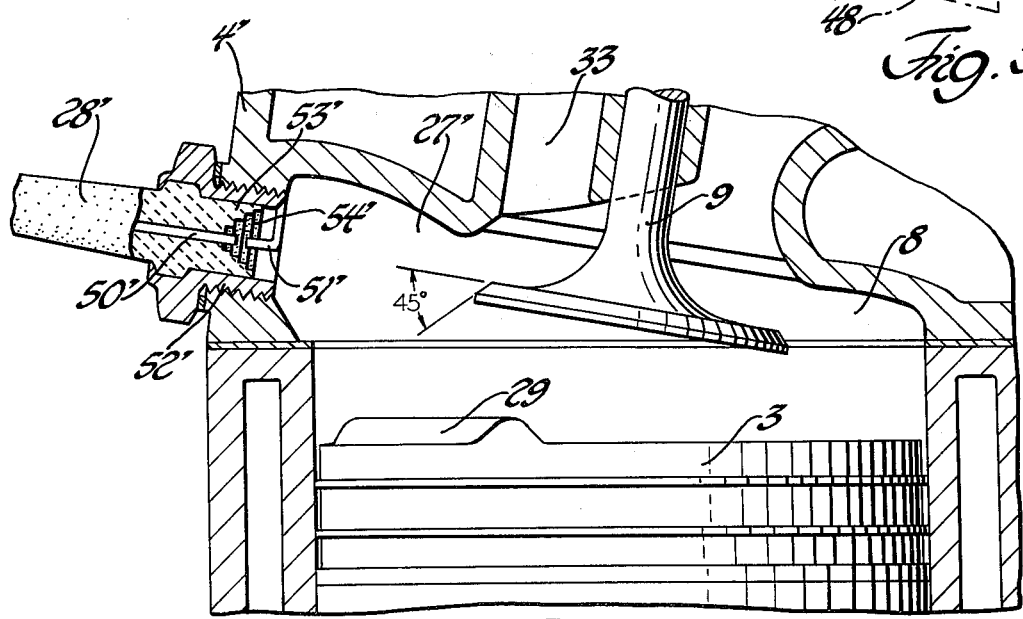
FIG. 6 is a view similar to FIG. 3 but showing a modified form of the invention.

FIG. 6 illustrates a slight modification of the invention wherein a so-called "inverted-type" spark plug 28' is used. With this plug the insulator body 53' has its external periphery closely fitting the internal periphery of the spark plug shell 52', and the center electrode 50' terminates within a hollowed out, generally conical cavity 54' which is open to the main combustion chamber 8 and forms part of the volume of the segregation chamber 27'. The ground electrode 51' has its extended end turned axially into the conical cavity 54' and terminating therein in proper gap relation with the end of the insulated electrode. The use of this type spark plug 28' thus enables forming the cylinder head 4' with a shorter protuberance in which to provide the segregation chamber 27' since the depth of the segregation chamber is extended into that portion of the spark plug wherein the gap between the electrodes is located.

Figure 7:
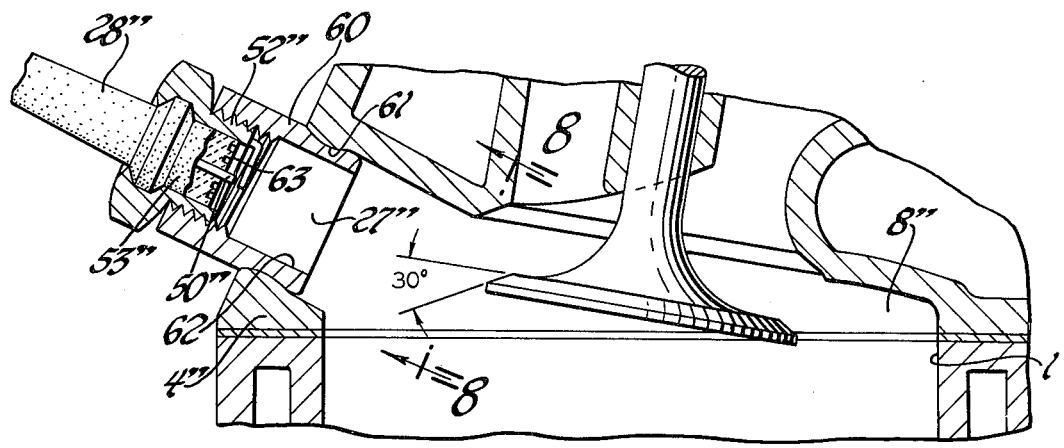
FIG. 7 is a view similar to FIGS. 3 and 6, but showing a still further modified form of the invention.

A further modification of the invention is shown in FIG. 7 wherein a spark plug 28'' has its shell 52'' threadedly mounted in one end of a metallic sleeve 60 which is sealingly fixed as by any suitable means, such as heat shrinking, metal spinning, threading, etc., at its opposite end in an opening 61 provided therefor in the cylinder head 4''. The sleeve 60, whose internal wall surface 62 forms the outer and larger portion of the segregation chamber 27'', operates at high temperature and provides good preheating of the mixture, thus insuring rapid combustion of lean as well as rich mixture. Furthermore, the spark plug operates at adequately high temperature. This combination of the sleeve 60 and the hot spark plug results in quicker engine warm-ups. Such a plug is shown having its insulator body 53 filling the space between the center electrode 50'' and the interior of the spark plug shell. The lower or inner end 63 of the spark plug insulator extends radially between the center electrode and the shell, and may be provided with a series of annular grooves to increase its effective surface area in the interest of inhibiting development of electrical shorts.

Figure 8:
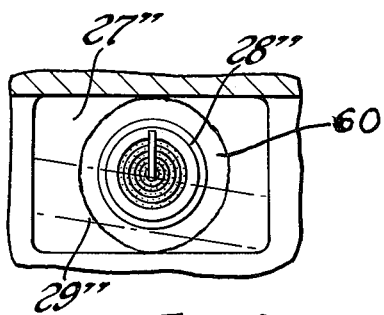
FIG. 8 is a fragmentary view taken in the direction of the arrows 8—8 of FIG. 7.

FIG. 7 represents a further modification in that the inlet valve seating angle is made 30° instead of 45°. Such shallower angle serves to reduce the component of mixture flow into the main combustion chamber 8'' in the direction downwardly toward the piston 3. The result, as illustrated in FIG. 8, is that the flow pattern 29'' of such mixture flow at its intersection with the cylinder periphery is elevated sufficiently with reference to the entrance to the segregation chamber 27'' that substantially all of such mixture flow is directed into the segregation chamber. Greater scavenging of the segregation chamber with ignitable fuel mixture is thereby obtained, along with retention of a larger quantity of such mixture therein during the compression stroke of the piston.

Figure 9:
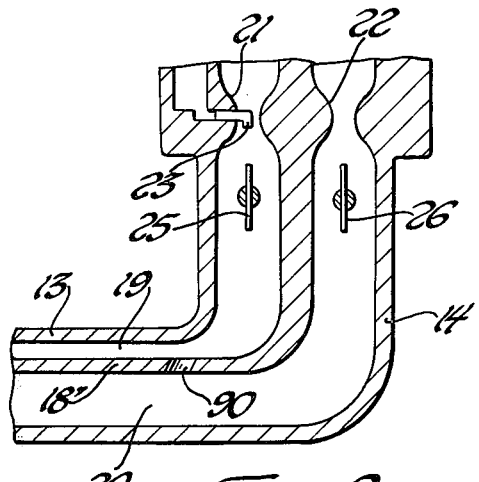
FIG. 9 is a fragmentary view similar to FIG. 1 but showing a modification of the fuel and air supply arrangement.

FIG. 9 illustrates an air and fuel supply for the respective passage sectors where it is desired to dispense with the fuel supply pipe 24 of FIG. 1 and still provide some enrichment of the air delivered from the lower passage sector. As shown in FIG. 9, air only is introduced past the throttle valve 26 in the riser sector 20, but a port 90 is provided in the partition 18' for enabling a "bleed-off" of some of the spark ignitable rich mixture from the upper sector 19 into the lower sector 20 to mix with the air flowing therethrough from the venturi 22.

Figure 10:
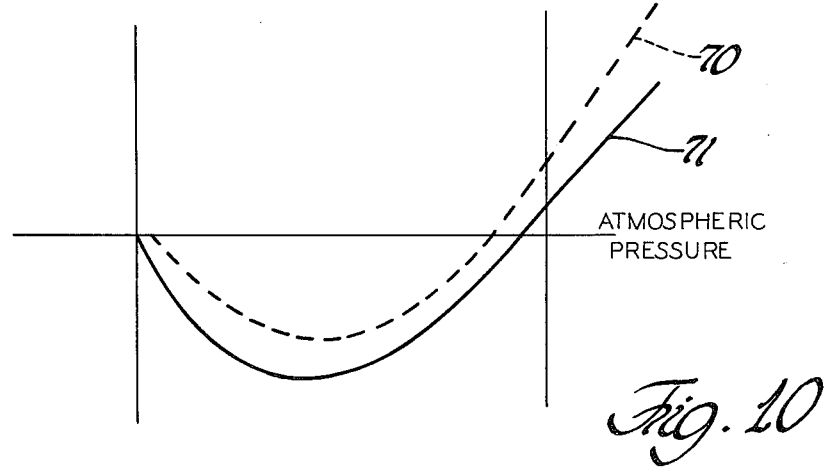
FIG. 10 is a graph representing the change in gas pressures in the two passage sectors at the intake valve seat during engine operation.

FIG. 10 is a graph generally illustrating a possible relative variation in gas pressures at the inlet valve seat during the suction stroke of the piston, the broken line curve 70 being that of the spark ignitable fuel mixture in the passage sector 16 of FIG. 1, and the curve 71 being that of the air or lean mixture in the lower passage sector 17. It will be noted that both these pressures are substantially sub-atmospheric throughout most of the period of travel of the piston between the start of the suction stroke and the end of the suction stroke. Such sub-atmospheric pressures may be utilized in correlating the adjustment of the two throttle valves 25, 26 to obtain the correct pressure relationship in the two passage sectors at the valve seat. In FIG. 11 these two throttle valves have their respective control arms 72, 73 pivotally connected through the respective links 74, 75 to a common control lever 76, which is, in turn, pivotally connected through a link 77 to an accelerator pedal 78. The lever 76 is also pivotally connected to a rod 79 which is shiftable by the diaphragms of two vacuum servos 80 and 81, respectively. Vaccum pressure lines 82, 83 connect these respective vacuum chambers with the valve seat ends of the inlet passage sector 17 for the air or lean mixture and the passage sector 16 for the spark ignitable fuel mixture. Interposed in each of these vacuum lines is a rotary valve which is driven at one-half engine speed as by a gear 86 driven from the engine's distributor drive (not shown). This rotary valve 85 is in the form of a shaft having cross-ports 87, 88 therein which open and close the vacuum lines 82, 83 respectively, once every two revolutions of the engine. One of these cross-ports 88 is best shown in FIG. 12, along with the connections of the vacuum lines to the sectors 16, 17 of the engine inlet passage 12. Thus, if the lean mixture suction just ahead of the intake valve should increase substantially relative to the rich mixture section at that point, the diaphragm of vacuum chamber 80 will move to the left as viewed in FIG. 11, causing the common lever 76 to effect a proportionate increase in the amount of opening of the lean mixture throttle valve 26 and a proportionate decrease in the opening of the rich mixture throttle valve 25. If, on the other hand, the lean mixture suction at the intake valve seat should decrease relative to the rich mixture suction at the valve seat, the diaphragm in the vacuum chamber 81 will overcome the suction on the diaphragm of chamber 80 and cause a concurrent greater opening of the rich mixture throttle valve 25 and partial closure of the lean mixture throttle valve 26. If desired, of course, the rich mixture suction at the inlet valve seat may always be maintained slightly higher than that of the lean mixture suction by appropriate selection of a vacuum diaphragm for the chamber 80 which has a higher effective operating area than that of the vacuum chamber 81, or by adjusting the mechanical advantage through which the common lever 76 acts in effecting opening and closing of the two throttle valves 25 and 26, etc.

As will be apparent from the above description, this engine can be constructed with relatively minor changes in tooling from that used in current production of automotive vehicle engines. The principal changes are the provision of a segregation chamber 27, 27', or 27'' in the cylinder head as an appendix to the main combustion chamber, the partition of the intake passage and intake manifold riser to segregate the lean and rich mixture flows, and the reshaping of the piston head to provide the deflecting ridge 29. As stated, either air alone may be introduced into the engine via the passage sectors 17 and 20 of the engine cylinder head and manifold riser, or sufficient fuel may be introduced to provide a relatively lean mixture therein, as by providing a fuel jet 24 above the throttle valve 26, or by providing a bleed-off port 90 in the manifold riser partition 18.

The embodiments of the invention in which an exclusive property or privilege is claimed are defined as follows:

1. In a four-stroke cycle spark ignition internal combustion engine having a power cylinder with a piston and a single inlet valve, a main combustion chamber at one end of the cylinder, an inlet passage having a connection to said main combustion chamber, a seat for said inlet valve surrounding said inlet passage at its connection to the main combustion chamber, a partition longitudinally dividing the inlet passage into separate passage sectors, said partition terminating at the valve seat with spaced wall portions defining a restricted entrance to the main combustion chamber for flow of spark ignitable gaseous fuel mixture into the main combustion chamber from one of said passage sectors, said restricted entrance having an area of five to twenty percent of the total area bounded by said valve seat, an elongated segregation chamber for receiving and retaining a portion of said ignitable fuel mixture entering the main combustion chamber, the configurations of said main combustion chamber and piston cooperating to maintain a continuously open and unrestricted entrance for flow of said spark ignitable mixture into the segregation chamber from the main combustion chamber throughout the reciprocatory stroke of the piston, said segregation chamber extending from the main combustion chamber a distance of one-fifth to one-half the diameter of the cylinder and having a volume of one percent to four percent of the piston-swept volume of the cylinder, and a spark plug having exposed spark generating electrodes projecting into the extended end of the segregation chamber, the length of the segregation chamber as measured from its said open end to its said extended end in relation to its volume being sufficient to provide that the portion of said ignitable fuel mixture remaining within the segregation chamber and compressed against said extended end during the compression stroke of the piston extends a sufficient distance from said extended end to envelop said electrodes, said piston having a ridge projecting toward the main combustion chamber and extending transversely of the piston opposite said restricted entrance for directing toward the open end of the segregation chamber during the compression stroke of the piston gaseous fuel mixtures contained in the cylinder between said ridge and the adjacent side of the cylinder.

2. The engine of claim 1, including an exhaust valve seat spaced laterally of the main combustion chamber from said inlet valve, said segregation chamber extending from the main combustion chamber in a direction generally tangentially of the cylinder and generally perpendicularly to a line bisecting each of said valve seats, said inlet valve being of the poppet type having a valve head movable into the main combustion chamber during opening of the inlet valve, said open end of the segregation chamber having its upper and lower extremities located approximately equi-distant above and below, respectively, the plane defined by said valve head in its fully open position.

3. The engine of claim 2, wherein said inlet valve seat and the seat contacting surface of the inlet valve head are at an angle to the axis of the inlet valve, said angle being such that during the suction stroke of the piston with the inlet valve in its fully open position fuel mixture flowing into the main combustion chamber through said restricted entrance will intersect the periphery of the cylinder in a generally trapezoidal shaped pattern which is substantially overlapped by said open end of the segregation chamber.

4. The engine of claim 3, wherein said angle is approximately 45° and approximately 50 percent of said pattern is overlapped by said open end of the segregation chamber.

5. The engine of claim 3, wherein said angle is approximately 30° and said pattern is substantially entirely overlapped by said open end of the segregation chamber.

6. The engine of claim 3, wherein said end of the cylinder defines the lower extremity of said open end of the segregation chamber, and said segregation chamber includes a bottom wall and an inclined arcuate ramp extending to said bottom wall from said one end of the cylinder to deflect into the segregation chamber said fuel mixture flowing into the main combustion chamber through said restricted entrance.

7. The engine of claim 1, wherein said spark plug extends generally longitudinally of the segregation chamber and includes an annular metallic shell and an insulator body within said shell, the internal surface of said shell and the adjacent external surface of said insulator body being in close fitting relationship, said insulator body having a cavity open to the main combustion chamber and constituting a portion of the segregation chamber, said electrodes terminating in spaced relationship within said cavity.

8. The engine of claim 1, wherein said spark plug extends generally longitudinally of the segregation chamber and includes an annular metallic shell and an insulator body within said shell, the internal surface of said shell and the adjacent external surface of said insulator body being in close fitting relationship, said insulator body having an end face extending transversely of the shell and defining said extended end of the segregation chamber, said electrodes terminating in spaced relationship opposite said end face.

9. The engine of claim 1, including a cylinder head having walls defining the main combustion chamber and a portion of the segregation chamber adjacent the main combustion chamber, said cylinder head having an opening in said portion opposite the main combustion chamber, said spark plug extending generally longitudinally of the segregation chamber and including an annular metallic shell and an insulator body within said shell, and a sleeve member extending outwardly from the cylinder head and having one end sealingly secured in said opening, the opposite end of said sleeve member being closed by said spark plug.

10. In combination with a four-stroke cycle internal combustion engine power cylinder having a single inlet valve, a piston and a combustion chamber opposite the piston, said inlet valve being openable into said combustion chamber toward the piston, a fuel mixture segregation chamber extending from said combustion chamber adjacent the inlet valve, an inlet passage communicating with said combustion chamber when the inlet valve opens, said inlet passage having partitioning means therein defining separate passage sectors for directing flow of a spark ignitable fuel and air mixture into the segregation chamber and flow of other gaseous fluid into said combustion chamber during the suction stroke of the piston, one of said sectors terminating with a restricted entrance to the combustion chamber for said spark ignitable mixture, a spark plug in the segregation chamber for initiating combustion of said spark ignitable mixture therein, and a deflecting ridge on the piston operative to maintain a relatively rich mixture of said spark ignitable mixture and said other gaseous fluid adjacent the side of the cylinder nearest the segregation chamber during the compression stroke of the piston, said ridge extending transversely of the piston opposite said restricted entrance, the configurations of said combustion chamber and piston cooperating to maintain a continuously open and unrestricted entrance for flow of said spark ignitable mixture into the segregation chamber from the combustion chamber throughout the reciprocatory stroke of the piston, said segregation chamber having a depth extending from said combustion chamber of one-fifth to one-half the diameter of the cylinder and a volume of one percent to four percent of the piston-swept volume of the cylinder.

11. The combination of claim 10, including a throttle valve in each of said passage sectors, throttle actuating means connected to each of said throttle valves, and means responsive to the pressures of said spark ignitable mixture and other gaseous fluid within their respective passage sectors for modifying the actuation of said throttle valves by said actuating means.

12. The combination of claim 10 including a port interconnecting said passage sectors upstream of said inlet valve for enriching said other gaseous fluid with said spark ignitable mixture prior to entry of said fluid into said combustion chamber.

* * * * *

UNITED STATES PATENT OFFICE
CERTIFICATE OF CORRECTION

Patent No. 3,918,419                    Dated November 11, 1975

Inventor(s) John Dolza, Sr.

It is certified that error appears in the above-identified patent and that said Letters Patent are hereby corrected as shown below:

Column 3, line 65, "7" should read -- 27 --.
Column 7, line 7, "Vaccum" should read -- Vacuum --.
Column 8, line 62, "trapezoidal" should read -- parallelogram --.

Signed and Sealed this second Day of March 1976

[SEAL]

Attest:

RUTH C. MASON
Attesting Officer

C. MARSHALL DANN
Commissioner of Patents and Trademarks